3,186,085
MULTIPLE TOOL LATHES
William C. E. Coate, Cincinnati, Ohio, assignor to The Lodge & Shipley Company, Cincinnati, Ohio, a corporation of Ohio
Filed Aug. 21, 1962, Ser. No. 218,324
26 Claims. (Cl. 29—568)

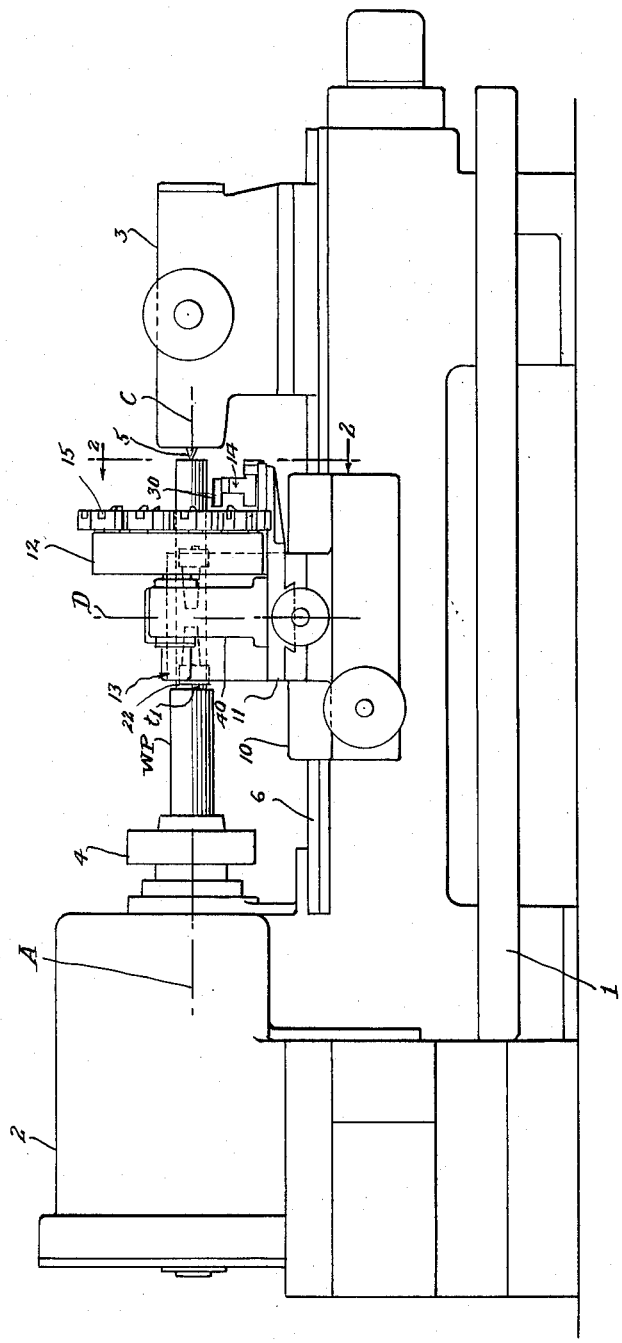

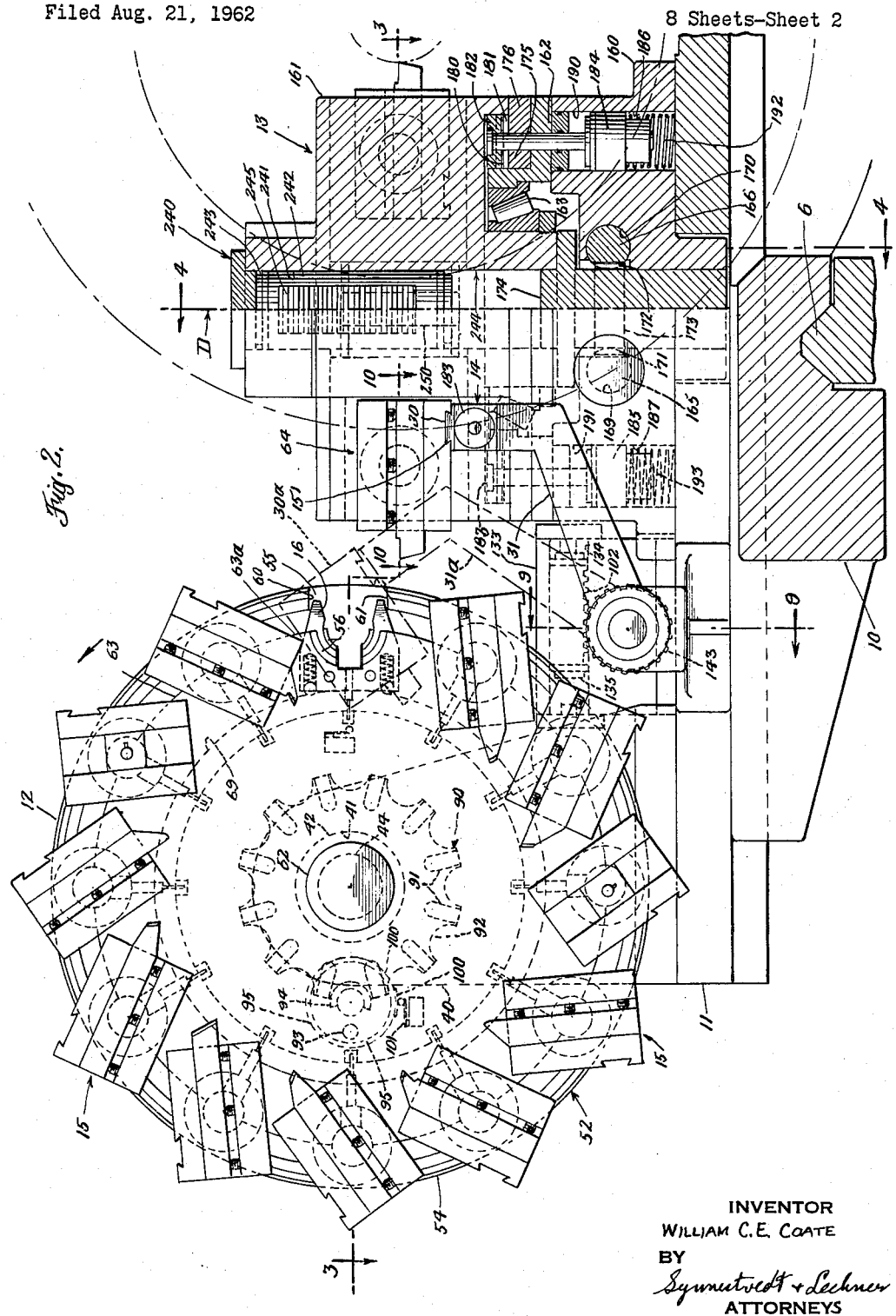

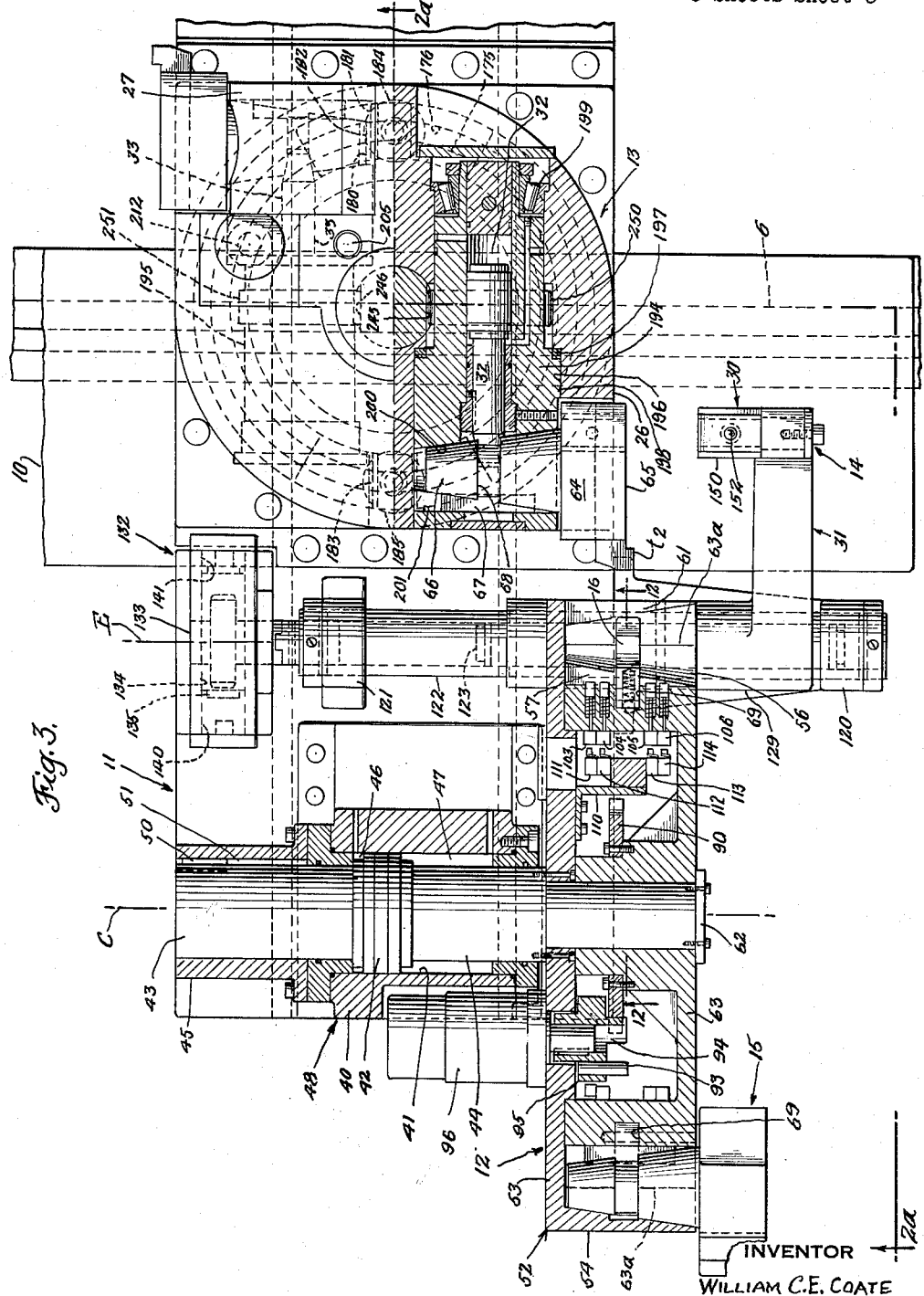

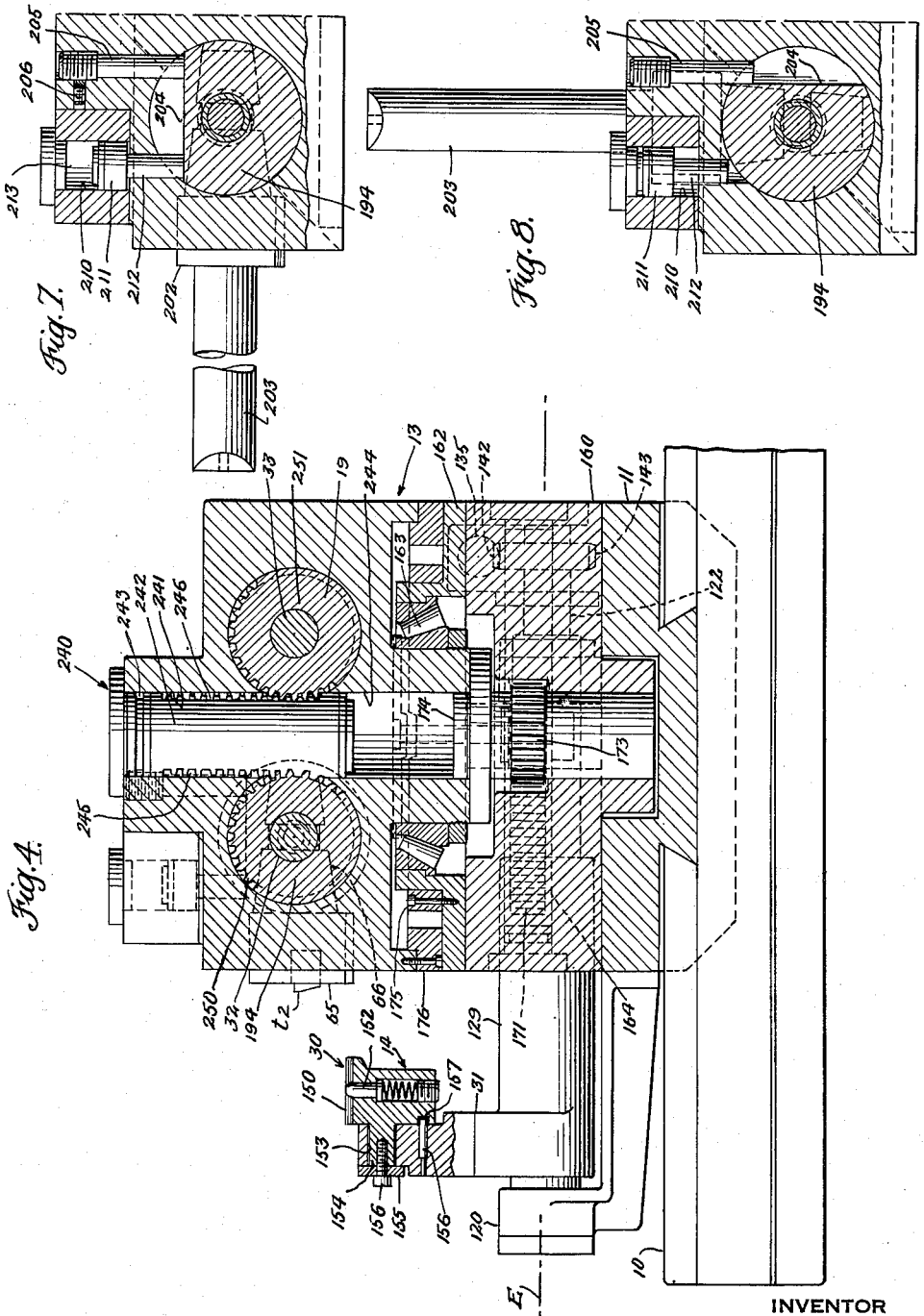

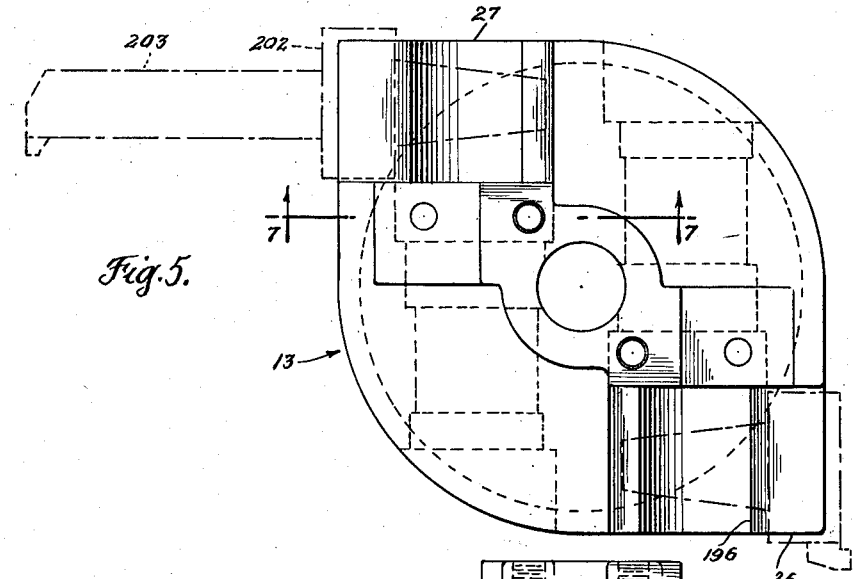
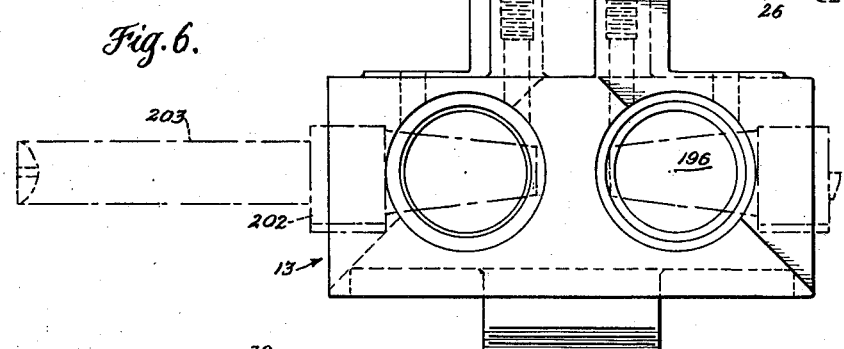
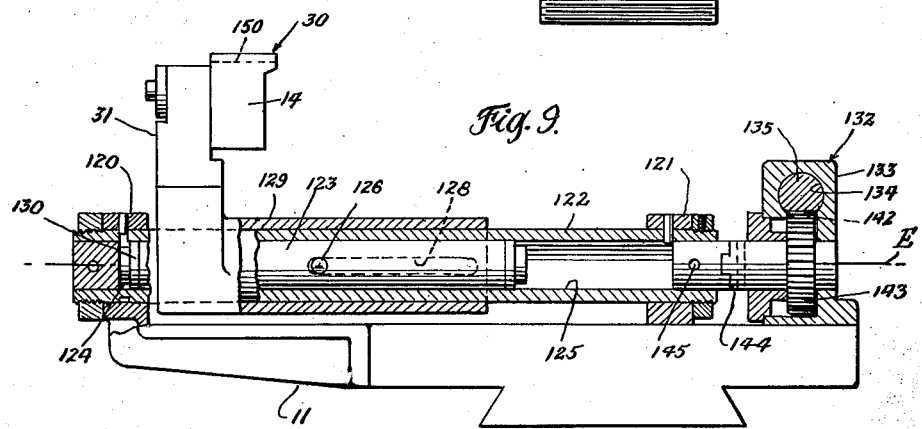

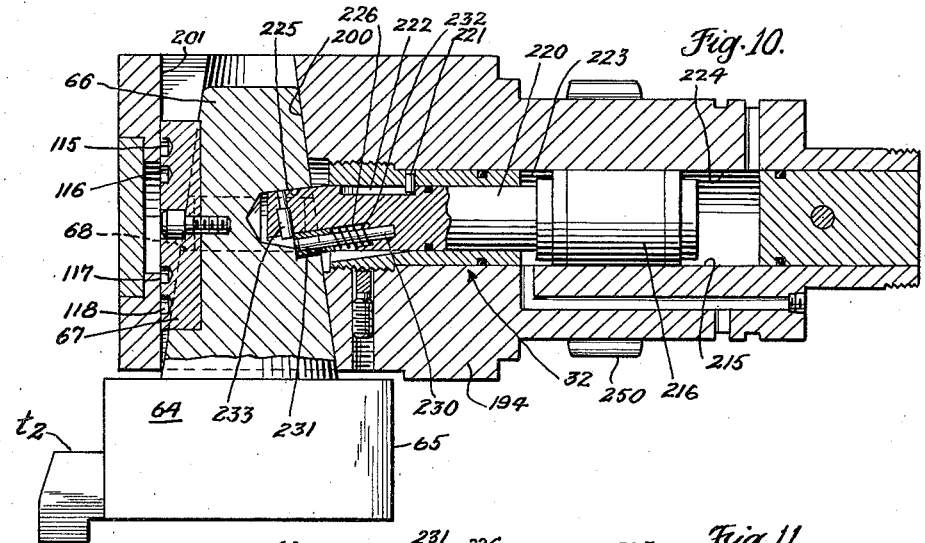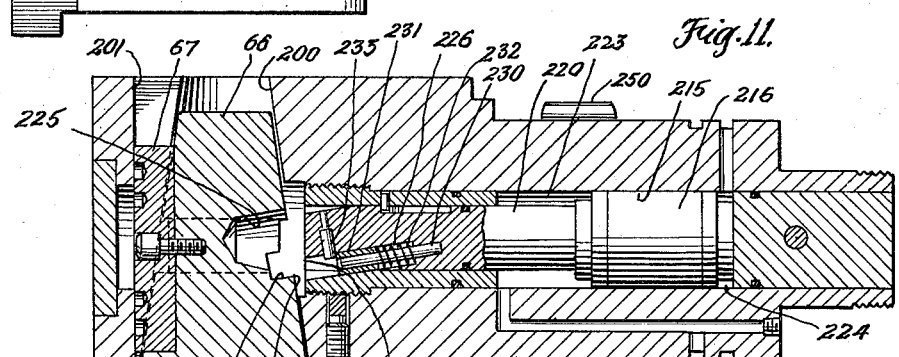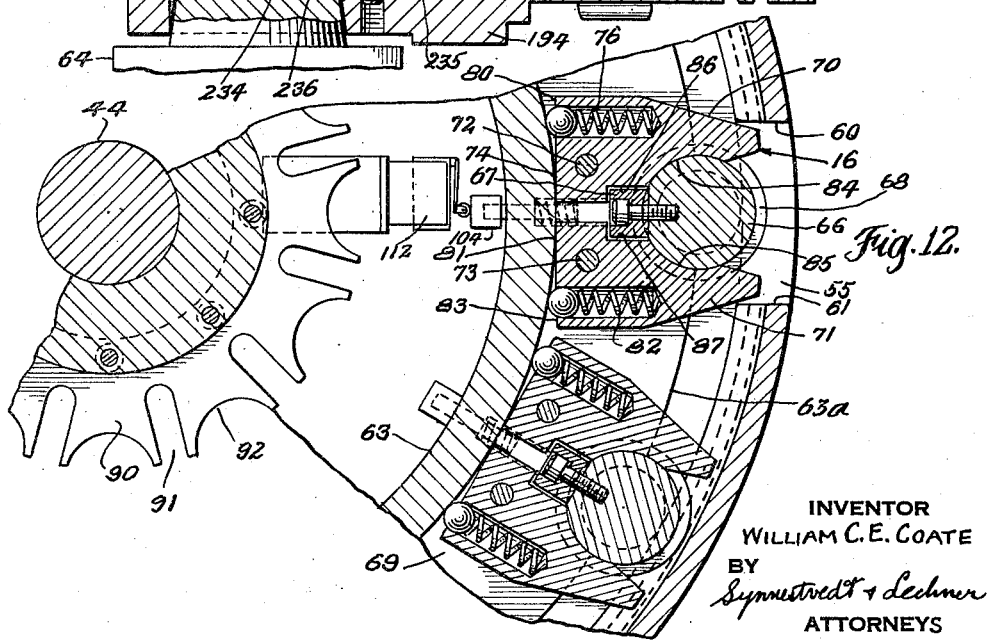

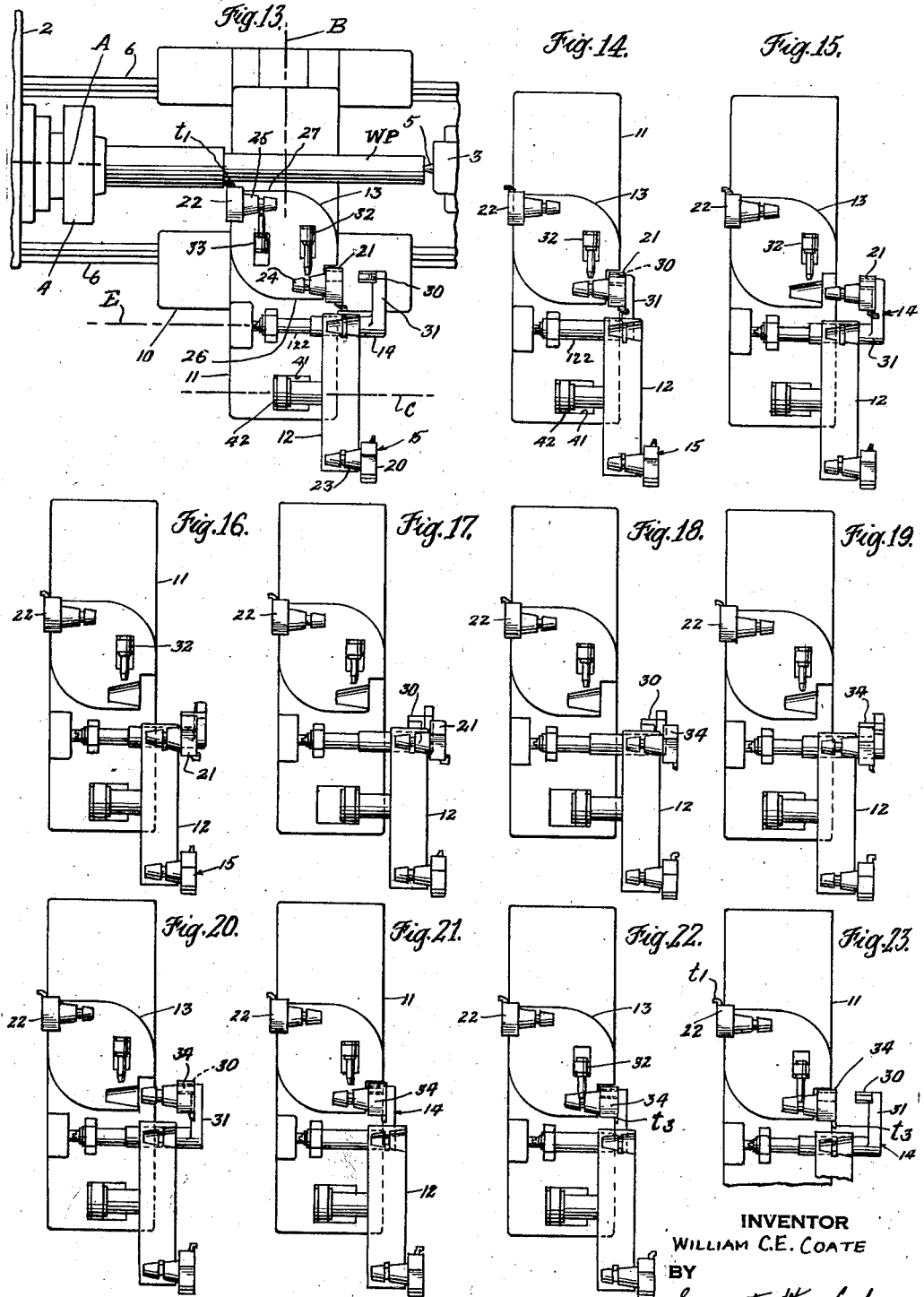

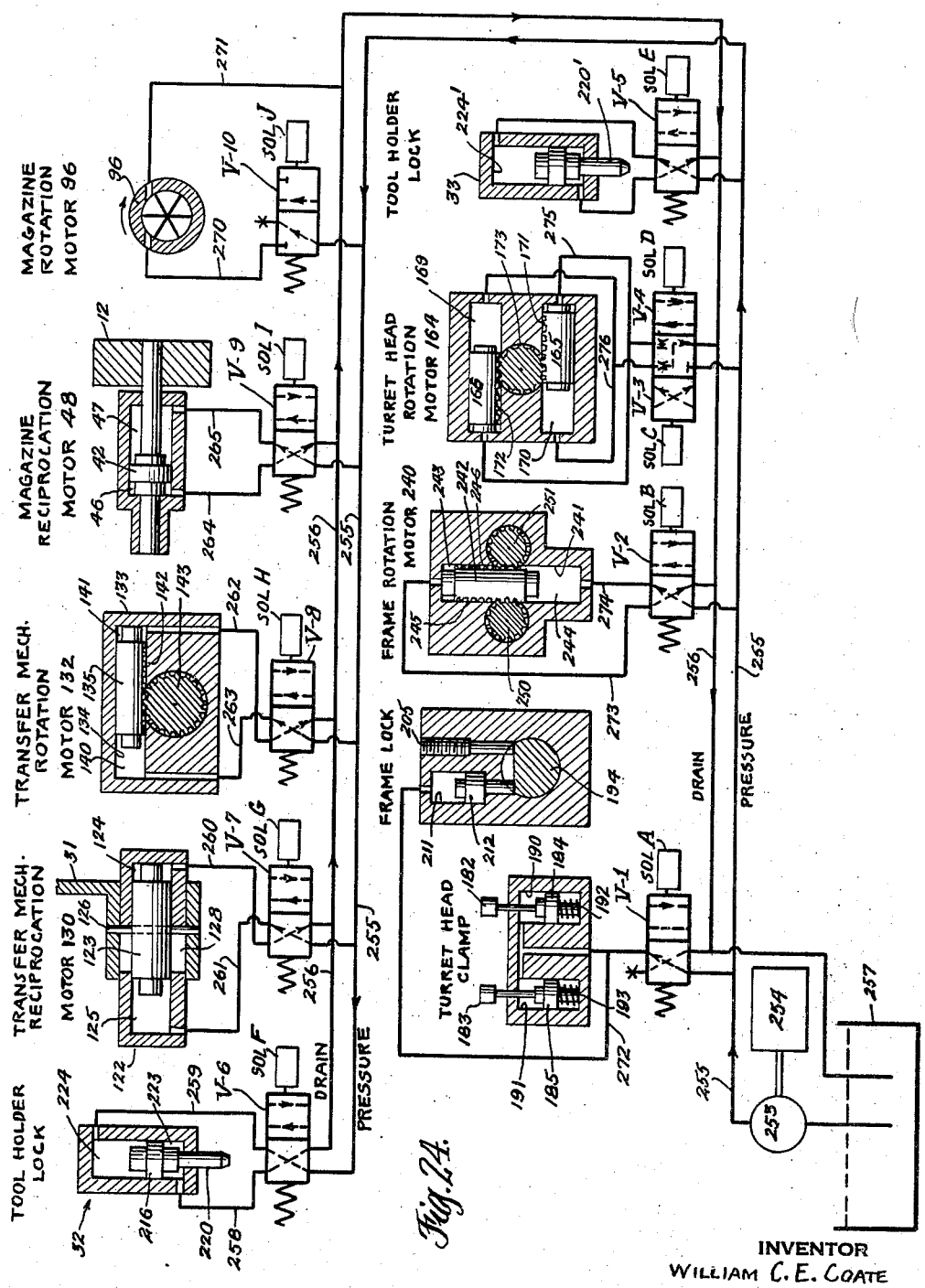

This invention relates to lathes and in particular relates to a multiple tool lathe for use in operations where several different kinds or types of tools are required for the machining of a blank and wherein the operation of the lathe for bringing some tool into contact with the blank is automatically controlled by way of information fed into the lathe as by punched or magnetic tape. Such a lathe is commonly called a numerical controlled lathe.

The present invention provides for certain improvements in the apparatus disclosed in my copending application Serial No. 143,076, filed October 5, 1961. That application discloses tool changing and supporting apparatus comprising a magazine for storing a large number of different kinds of tools, together with a turret adapted to hold a single tool alternatively in a position for performing a machining operation, or in a position for removal and replacement by a new tool, the transfer of a tool as between magazine and turrent being accomplished by movements of the magazine. Of necessity the machining operation must cease during the tool changing interval.

In one broad aspect the present invention provides improvements over the invention of application No. 143,076 in that the tool changing operation can be carried out without stopping the machining operation. According to the invention, while one tool is machining a blank, the next tool to be used is in ready condition so that as soon as the machining operation is completed, the tools can be switched and the ready tool quickly brought into position to machine the blank. The machining of the blank is interrupted only for a short interval for switching tools and is not interrupted for the longer tool changing period.

More specifically, the invention contemplates for a lathe of the kind in question, tool changing and supporting apparatus including a magazine for storing a plurality of different kinds or types of tools and a turret carrying a pair of tools, one of which is in position for performing a machining operation and the other is in position to be removed and replaced by a new tool to be used in a subsequent machining operation, together with means to transfer a used tool from the turret to the magazine and to transfer a new tool from the magazine to the turret, the tool changing operation taking place while the first mentioned tool is performing a machining operation.

Various advantages and features of the invention will be apparent from a typical embodiment described below in connection with the following drawings, wherein:

FIGURE 1 is a side elevational view of a lathe incorporating the present invention;

FIGURE 2 is an enlarged, elevational view looking in the direction of the arrows 2—2 in FIGURE 1, with the right hand half of the turret structure shown in section as indicated by line 2a—2a in FIGURE 3;

FIGURE 3 is in part a plan view of FIGURE 2 and in part a section on the line 3—3 of FIGURE 2;

FIGURE 4 is a cross sectional, elevational view of the turret structure as taken on the line 4—4 of FIGURE 2;

FIGURE 5 is a plan view showing the turret structure;

FIGURE 6 is a front view of FIGURE 5;

FIGURE 7 is a section on the line 7—7 of FIGURE 5;

FIGURE 8 is a section similar to that shown in FIGURE 7 except that the frame mounting the tool holder has been rotated 90°;

FIGURE 9 is a longitudinal section taken on the line 9—9 of FIGURE 2;

FIGURE 10 is an enlarged plan section on the line 10—10 of FIGURE 2;

FIGURE 11 is a section similar to that of FIGURE 10;

FIGURE 12 is a fragmentary sectional view taken on the line 12—12 of FIGURE 3;

FIGURES 13–23 are diagrammatic, plan views illustrating the relative positions assumed by the turret, the magazine and the transfer mechanism for transferring tools as between the magazine and turret; and FIGURE 24 is a diagrammatic view illustrating certain of the hydraulic operating mechanism for the equipment.

In FIGURE 1, I have illustrated the general configuration of a conventional engine lathe which has been adapted for numerical control. The apparatus of the invention disclosed herein is mounted on the cross slide of the lathe. The lathe has a bed 1 and on the left hand end of the bed is mounted a head stock 2 and on the right hand end a tail stock 3. The head stock spindle 4 is rotated about an axis A by a motor and gear arrangement (not shown) in the head stock. The tail stock 3 is adjustable back and forth along the axis of the bed and carries a live center 5. The ways 6 on the bed support the carriage 10 for reciprocating motion along the bed in the direction of the axis A. The cross slide 11 is mounted on the carriage for reciprocating motion over the carriage along an axis B (see FIGURE 13), which is oriented at 90° to the axis A. Power for moving the carriage and cross slide is provided by conventional motors and feed screws.

The operation of the carriage, cross slide and the spindle drive mechanism in the head stock are all under the direction of the numerical control system. Such systems are well known in the art and further comments are unnecessary, suffice it to say that the operation of the magazine, turret and transfer mechanism of the present invention is determined by the system which, as will be described later, exercises control by virtue of energizing and de-energizing certain solenoids.

With the lathe configuration described above, the plane of motion of the cross slide 11 is horizontal. However, it will be appreciated that the invention is applicable to a lathe where the cross slide is not horizontally oriented.

In the embodiment of the invention illustrated herein, the magazine is indicated by 12, the turret by 13, and the transfer mechanism by 14. The turret, magazine and the transfer mechanism are all fixed to the cross slide 11. The magazine is mounted on the cross slide so as to be rotatable about an axis C and to be capable of reciprocating motion along the axis C. As shown, the axis C lies in the same plane as the axis A and is parallel to the axis A (see FIGURE 13). The magazine carries a plurality of tool holders and tools generally indicated by 15 which are spaced about the periphery of the magazine (FIGURE 2). The holders are removably mounted in carriers on the magazine. A holder is insertable in a carrier or removable from a carrier only by motion in a direction generally radially of the axis C. For the insertion or withdrawal operation, the magazine is rotated until the desired holder and carrier are in a predetermined rotational positioon. This position is called a charge position and is the position of the carrier 16 shown in FIGURE 2. In the charge position the axial motion of the magazine is used for stripping a holder from or depositing a holder in the transfer mechanism 14.

Each of the tool holders is identical in size and shape and have a shank in the form of a truncated cone; for example, see the tool holders 20, 21 and 22 in FIGURE 13 having the shanks 23, 24 and 25. As will be apparent, the axis of each shank is parallel the axes A and C.

The turret 13 is adapted to be rotated about the vertically extending axis D. The turret has a pair of tool holder mounting sections or lobes 26 and 27 (FIGURE 13), which are constructed to respectively mount tool holders, for example, the tool holders 21 and 22. As shown in FIGURE 13, the tool holder 22 is positioned so that its tool t–1 is machining or performing a working operation on the workpiece WP. The tool holder 21 is positioned so that it can be removed and replaced by a new tool holder. The replacement of holder 21 takes place during the time that the tool t–1 is machining the workpiece. After the tool holder 21 has been replaced and the machining operation completed, the slide 11 is moved to back off the tool t–1 from the workpiece and then the tool holders are reversed in position so that new tool holder is ready for working or machining the blank and the used tool holder 22 is ready to be withdrawn.

The transfer mechanism 14 includes a transfer carriage 30 mounted on a transfer arm 31. The arm 31 and carriage 30 are mounted for reciprocating motion along an axis E which is parallel to the axis A and for rotational motion about axis E from a turret-charge position (see position of arm and carriage indicated by the full lines in FIGURE 2) to a magazine-charge position (see the position of the arm and carriage indicated by the dotted lines 30a and 31a in FIGURE 2).

In the turret-charge position the arm is adapted to move toward the turret so that the carriage engages and picks up a tool holder and then backs away from the turret carrying the tool holder with it. In the magazine-charge position, the carriage is adapted to receive a holder from the magazine or to have a holder stripped off. Each of the latter operations is accomplished by axial motion of the magazine.

With the above in mind, a better understanding of the arrangement and function of the invention will be afforded with reference to a general description of the sequence of operation of the turret, magazine and transfer mechanism. This will be done in connection with FIGURES 13 through 23.

In FIGURE 13 assume that the tool t–1 is just beginning to perform its machining operation on the workpiece; that the magazine is in the charge position (as in FIGURE 2) and that the transfer arm in the turret-charge position (as in FIGURE 2) and that the tool holder locking mechanism 32 has unlocked the holder 21 (with the locking mechanism 33 locking the holder 22).

The transfer mechanism is now operated to remove the holder 21 from the turret. To do this, the transfer arm and carriage are moved left or towards the head stock so that the carriage engages the holder 21 as indicated in FIGURE 14. The transfer arm and carriage are then moved to the right (FIGURE 15) or towards the tail stock to withdraw the holder 21 from the turret.

The holder 21 is now deposited in the magazine. To do this, the transfer arm and carriage are rotated to the carriage-charge position so that the holder 21 is now deposited in a carrier in the magazine (FIGURE 16). Since the transfer carriage 31 and holder 21 are still engaged, the holder must be stripped from the transfer carriage. This is done by movement of the magazine along the axis C. Thus with reference to FIGURE 17, the magazine is moved to the right and strips the holder from the transfer carriage.

A new holder is now placed in the transfer carriage. To do this the magazine is rotated until the new holder and its carrier are in the charge position, as indicated for the holder 34 in FIGURE 18.

The new holder 34 now must be placed in the transfer carriage. This is done by moving the magazine to the left (FIGURE 19) until the holder is engaged with the transfer carriage. The new holder 34 is now withdrawn from the magazine and this is done by rotating the transfer arm away from the magazine-charge position. This movement of the transfer arm and carriage strips the holder out of the magazine. The transfer arm and carriage are rotated until they assume the turret-charge position (FIGURE 20). The new holder now must be inserted in the turret and to do this the transfer arm and carriage are moved to the left until the holder 34 is inserted in the turret (FIGURE 21).

The locking mechanism 32 in the turret is operated so as to lock the holder 34 in position. The transfer arm and carriage are then moved to the right away from the holder as indicated in FIGURE 23.

The tool changing or transfer operation takes place during the time that the tool t–1 is machining the workpiece. When the machining operation is completed, the cross slide backs the tool away from the workpiece and then the holders 22 and 34 are rotated so that they extend vertically. Then the turret 13 is rotated about its axis E to reverse the positions of the holders 22 and 34. The holders 22 and 34 are then rotated so that they extend horizontally. The holder 34 then is in position for machining a workpiece and the holder 22 is ready to be removed and replaced by the next tool to be used in the sequence of operation.

The principal advantage of performing the tool changing operation while the cutting or machining operation is in progress is that the machining operation is practically continuous. This is of special importance from the economic standpoint because control equipment for lathes of the kind in question is relatively expensive (far exceeding the cost of the machine itself) and it is mandatory for lower machining costs that the equipment be operated to the fullest extent possible.

The feature of providing for practically continuous machining is of particular significance for multiple tool operations where one or more of the cutting operations requires a relatively short period of time because the invention minimizes the time for tool changing. Thus the tool changing time is not disproportionately larger than the machining time as would be the case in an arrangement where the tool changing took place between the machining operations.

The structural details of the magazine will be explained in connection with FIGURES 2, 3 and 12.

The magazine includes a support or frame 40 which is fixedly attached to the cross slide 11. The top of the frame is constructed to form a cylinder 41. In the cylinder is a double acting piston 42 having extensions 43 and 44. The extension 43 is disposed in a support 45 mounted on the frame 40. By controlling fluid in the chambers 46 and 47, the piston is reciprocated back and forth in the cylinder. The cylinder 41 and piston 42 constitute a motor 48 for reciprocating the magazine. A key 50 in the extension 43 of the piston operates in a key way 51 in the support 45. The key and key way prevent the piston from rotating but permit the reciprocating motion. The reciprocating motion of the cylinder is along the axis C.

The extension 44 fixedly carries a cover 52 comprising an annular plate 53 and an annular, axially extending keeper 54. As best seen in FIGURE 2, the keeper 54 is provided with a radially extending slot 55, the walls of which are designated as 60 and 61. On the end of the piston extension 44 is a smaller plate 62. Inside of the cover 52 and between the plates 53 and 62 is tool holder carrier support means 63, which is mounted on the piston extension 44 to be rotatable relative to the piston. The periphery of the support 63 (indicated at 63a) is spaced from the inside surface of the keeper 54. The various tool holders fit into this space. The carrier support 63 has a plurality of conical shaped half sockets 56 spaced around its periphery. Each half socket has a key way 57. The half socket 56 and key way 57 are used for supporting the various tool holders in the magazine.

Each of the holders to be carried in the magazine has the same configuration. This configuration will be explained with reference to the holder 64 shown in FIGURES 10 and 3. The holder 64 has a head 65 mounting a tool t–2. Secured to the head is a conical shaped shank 66 and extending along the axis of the shank is a key 67. Around the periphery of the shank 67 is a groove 68.

As mounted in the magazine, the conical shaped shanks of the holders are respectively disposed in the half sockets 56 and the keys respectively disposed in the key ways 57.

The carriers (such as carrier 16) which cooperate with the half sockets 57 to mount the tool holders in the magazine are disposed in a groove 69 formed on the periphery of the carrier support 63. There is one carrier for each half socket. All of the carriers have a construction which is identical to the construction of carrier 16.

The slot 55 on the keeper 54 provides access for moving a tool holder in a generally radial direction in and out of the magazine. A tool holder is moved through the slot 55 to be disposed in the half socket and carrier. A holder is withdrawn from the carrier and half socket by being moved outwardly through the slot 55. The slot 55 defines the magazine-charge position in that the support 63 is rotated until the appropriate carrier is brought into registry with the slot (as carrier 16 in FIGURE 2) for the load and unload operations.

Since all the carriers are alike, a description of the carrier 16 will suffice. The carrier 16 (FIGURE 12) is disposed within the peripheral groove 69 and comprises a pair of jaws 70 and 71 which are respectively mounted on shafts 72 and 73 secured to the carrier support 63. The shafts extend parallel to the axis C. The jaw 70 can rotate about the shaft 72 clockwise until the end 74 engages the bottom of the groove 69. The jaw is urged in the clockwise direction by the spring 76. The jaw 70 can also rotate counterclockwise (against the force of spring 76) until the edge 80 contacts the bottom of the groove 69. The jaw 71 can move counterclockwise about the shaft 73 until the end 81 contacts the bottom of the groove. A spring 82 urges the jaw counterclockwise. The jaw 71 can move clockwise (against the force of spring 82) about the shaft until the end 83 contacts the bottom of groove 69.

The jaw 70 has an annular shaped cavity 84 and the jaw 71 has an annular shaped cavity 85. These cavities face one another. When the holder 65 is disposed between jaws 70 and 71, the jaws fit into the groove 68 with the cavities 84 and 85 partially surrounding the shank. The cut outs 86 and 87 in the jaws 70 and 71 accommodate the key 67. The holder can be forced between the jaws because both are yieldable due to the springs. The springs are chosen so that when the holder is disposed between the jaws, sufficient force is exerted so that the holder is firmly maintained in position. It will be observed that by virtue of the fact that jaws are disposed in the peripheral groove on the shank, the shank is maintained against axial movement.

The carrier support 63 is adapted to be intermittently rotated by mechanism which is similar to that disclosed in my above mentioned copending application. This mechanism is briefly described below.

On the carrier support 63 is a spider 90 having drive slots 91 and locking slots 92. The drive slots 91 are adapted to be engaged by a pin 93 and the locking slots are adapted to be engaged by a lug 94. The pin and lug are mounted on a rotor 95. The rotor is driven by a fluid motor 96. The rotor 95 has a cam 100 which is adapted to engage the stop switch 101.

As explained in my copending application, the pin 93 acting in the drive slots 91 intermittently rotates the spider and the lug 94 maintains the spider in each intermittent position.

The magazine drive mechanism is controlled so that when some particular tool is desired for the next machining operation, the magazine is rotated until the proper carrier is in the charge position (FIGURE 2). When the magazine arrives at the charge position, further rotation is stopped so that the tool holder can be transferred from the magazine to the turret. For determining when the magazine must be stopped, I have provided a code system which operates as a function of coding means on each tool holder. Irrespective of which carrier is supported in a tool holder, when the holder arrives at the charge position, the magazine will be stopped.

For coding purposes I have provided on the magazine several groups of plungers, there being one group for each carrier with four plungers in each group, which gives ample coding for the twelve tools in the magazine. For example, for the carrier 16 (FIGURE 3) I have provided the plungers 103, 104, 105 and 106. Each plunger is mounted in the support 63 so as to be movable radially of the axis C. Each plunger has a spring which biases the plunger outwardly.

One or more of the plungers in a group actuates one or more of a set of four switches set up in alignment with the magazine-charge position. Thus the bracket 110 on the plate 53 carries the switches 111, 112, 113 and 114 (FIGURE 3). When the plungers 103–106 for the carrier 16 are in the magazine-charge position, the plungers are radially aligned with the switches and inward motion of a plunger will actuate its associated switch. Inward movement of one or more of the plungers is determined by cams on the tool holder. For example, with reference to FIGURE 10, it will be seen that on the key 67, the area 115 is flat so that when the holder is mounted in the carrier 16, the area 115 will contact the plunger 103 and move the same inwardly to contact the switch 111. The ends of the plungers 104, 105 and 106 fit into recesses 116, 117 and 118 on the key 67 so that these plungers are not moved radially inwardly when the holder is in the carrier.

As will be apparent, appropriate cam surfaces on each of the holders will activate various combinations of switches. The automatic control circuits for the lathes preselect the desired combination of carrier switches in accordance with the tool holder desired to be used. When these switches are actuated, the system will be set up for stopping magazine rotation. Thus, the magazine will be rotated until the correct group of plungers move into the charge position and actuate the desired switches and the stop switch 101 is actuated.

The mechanism for transferring tool holders as between the magazine and turret will next be described.

With reference to FIGURE 9 a pair of trunnions 120 and 121 are fixedly mounted on the cross slide 11 and rotatably support a cylinder 122. As indicated in FIGURE 3, the rotational axis E of the cylinder extends parallel to the magazine rotational axis C. Within the cylinder 122 is a double acting piston 123 which is mounted for reciprocating motion along the axis E. Piston motion is effected by controlling fluid in the chambers 124 and 125. The piston carries a radially extending pin 126 which extends outwardly of the cylinder through diametrically opposed slots, one of which is indicated at 128. Surrounding the cylinder 122 is a sleeve 129 which is connected to the pin 126. Reciprocating motion of the piston is transferred via the pin 126 to the sleeve 129. The sleeve 129 mounts the transfer arm 31 and carriage 30. The cylinder 122 and piston 123 constitute a motor 130 for reciprocating the transfer carriage.

Rotational motion of the cylinder 122 causes rotation of the sleeve 129 and piston 123. The piston is adapted to be rotated by the motor 132. The motor 132 includes a housing 133 formed with a cylinder 134 mounting a reciprocating piston 135. As indicated in FIGURE 3, the cylinder 134 and piston 135 are oriented at right angles to the axis E. Motion of the piston 135 is effected by controlling fluid in the chambers 140 and 141. The bottom of the piston 135 has a rack 142 which is meshed with a pinion 143 mounted on the coupling 144 connected to the cylinder 122 by the pin 145. Reciprocating motion of the piston 135 causes oscillation of the cylinder 122 and piston 123 and sleeve 129.

The sleeve 129 carries the transfer arm 31 and carriage 30 and these partake of the oscillation of the sleeve. Referring to FIGURE 3, when the piston is moved all the way to the right (as shown), the transfer arm 31 and carriage 30 are in the turret-charge position as shown by the full lines in FIGURE 2. When the piston 135 is moved all the way to the left, the transfer arm 31 and carriage 30 are rotated to the magazine-charge position as indicated by the dotted lines in FIGURE 2.

The transfer carriage 30 has dove tails 150 which are adapted to interengage with corresponding dovetails in a tool holder, for example, with reference to FIGURES 2 and 4, the dove tails 151 on the tool holder 64. A spring loaded plunger 152 on the carriage is adapted to interengage with a detent on each tool holder so as to properly position the tool holder on the carriage. The dove tails and plunger movably support a tool holder on the carriage.

The carrier has a yieldable connection with the arm 31 and the structure for accomplishing this is best shown in FIGURE 4. The arm 31 has an aperture 153 within which is the extension 154 of the carriage. The diameter of the aperture 153 is greater than the diameter of the extension 154. A slide plate 155 secures the carriage on the arm. The slide plate 155 is adjusted so that the carriage has freedom of movement in the aperture. The pin 156 on the arm 31 operates in the oversize hole 157 on the carriage. The pin prevents the carriage from rotating but does not interfere with the yielding action. The motion of the carriage is a limited motion which takes place in a plane normal to the axis E.

The turret mechanism will next be described.

With reference to FIGURE 2, the turret has a base section 160 which is fixed on the cross slide 11 and a top part or head section 161.

The bottom section 160 mounts a bearing ring 162 which supports the outer race of the bearing 163, the inner race of which is connected to the head section 161. The bearing 163 rotatably supports the head section for rotation about the axis D.

Rotation of the turret is effected by a motor 164 which comprises a pair of double acting pistons 165 and 166 respectively mounted for reciprocating motion in cylinders 169 and 170 formed in the bottom section. The pistons carry racks 171 and 172 respectively interengaged with a pinion 173 connected to an extension 174 on the head section 161.

For locking and locating the turret in position the turret has inner and outer rings 175 and 176. The inner ring 175 is connected with the bearing ring 162. The outer ring 176 is connected with the head section 161 and is rotatable therewith. The rings 175 and 176 have aligned, radially extending slots 180 and 181 which accommodate a shoe 182. On the opposite side, the ring has similar slots which accommodate the shoe 183.

The turret operating pistons 165 and 166 move the turret substantially to the desired position so that the slots are substantially radially aligned and then the shoes 182 and 183 are moved downwardly into the slots to precisely position and lock the turret. The downward motion of the shoes is accomplished by the pistons 184 and 185 operating in cylinders 186 and 187 formed in the bottom section. Fluid in the chambers 190 and 191 effects downward motion of the pistons against the springs 192 and 193. The springs 192 and 193 normally bias the pistons in an upward direction.

As will be apparent the above described turret structure is similar to that disclosed in my copending application.

The tool holders are supported in the turret by means of frames or mounts 194 and 195 in the lobes 26 and 27. The mounts are identical in construction and a description of the mount 194 (see FIGURE 3) will suffice. The mount 194 is generally cylindrical in shape and is disposed in a cavity 196 formed in the lobe 26. The mount is rotatably mounted in the cavity by the axial thrust bearing ring 197 and radial thrust bearing 198 formed by the fitting between the outer surface of the mount 194 and the cavity 196. The bearing 199 is used to preload the bearing 197. The forward part of the mount is formed with a conical shaped socket 200 which corresponds to the conical shape of the tool holder shank. The surface forming the conical shank of each holder and conical socket 200 are accurately ground so that when the shank is brought up tightly, the holder is in a predetermined axial position. The orientation of the holder in the socket is controlled by a keyway 201 which accommodates the key 67. The conical shank, socket, key and keyway structures are the same as disclosed in my copending application. The locking mechanism 32 maintains the holder in the mount. As will be apparent, rotation of the mount 194 clockwise 90° (as looking toward the left in FIGURE 3) will cause the holder to extend vertically.

The position of the mounts 194 and 195 shown in FIGURES 3 and 4; i.e., with the axis of each tool holder shank extending horizontally, is the active position. Rotation of the mount and holder 90° from this position places the holder in the inactive position. The purpose for rotating the tool holders as between the active and inactive positions is to maintain the tools in an out-of-the-way position during turret rotation. The active and inactive positions are clearly shown in FIGURES 7 and 8 where a holder 202 carrying a boring bar 203 is mounted in the mount 194. FIGURE 7 represents the active position where the boring bar 203 extends horizontally. FIGURE 8 represents the inactive position wherein the bar 203 extends vertically.

The head structure carries means for accurately determining the active position of the mount and also has means to positively lock the mount in the active position. This kind of structure is necessary in order to accurately position the tool for a working operation. The same structure also determines the inactive position.

With reference to FIGURES 7 and 8, the mount 194 has a land 204 which is adapted in both the active and inactive positions to engage with an abutment 205 accurately positioned in the head section and locked with the set screw 206. The head section also is formed with a cylinder 210 mounting a piston 211 having an extension 212. When the mount has been rotated to the position of FIGURE 7 (active position), fluid enters the chamber 213 and causes the piston to move downwardly so that the extension 212 abuts the land 204 and the mount is locked in position. Prior to rotating the mount to the inactive position, the pressure in the chamber 213 is relieved so that upon rotation, the mount pushes the extension 212 and the piston 211 upwardly as indicated in FIGURE 8. Note in FIGURE 8 that the land 204 engages the abutment 205. This engagement determines the inactive position.

Each mount is provided with locking means (32 and 33) which functions to securely lock the holder in the mount during the working operation of a tool and to unlock and loosen the holder so that the same can be easily removed from the mount.

The locking mechanisms 32 and 33 are identical and explanation will be only in connection with mechanism 32. In FIGURES 10 and 11, the mount 194 has a cylinder 215 within which is a piston 216 adapted to reciprocate back and forth in the cylinder. Connected to the piston 216 is a plunger 220 which reciprocates back and forth with the piston. The key 221 in the mount operating in the key way 222 in the plunger permits the reciprocating motion, but prevents the plunger and piston from rotating. The reciprocating motion is controlled by fluid in the chambers 223 and 224.

The forward part of the plunger 220 is adapted to fit into a cavity 225 formed in the shank 66 of the holder. When the plunger is in the position shown in FIGURE 10, the plunger engages the cavity wall and forces the conical shank 66 tightly against the conical cavity 200 in the mount, a part of the cavity wall engaging the plunger constituting a locking surface.

To unlock the holder, the plunger 220 is moved out of the cavity to the position shown in FIGURE 11. Inasmuch as the conical surfaces on the shank and socket are tightly engaged when the holder is locked, it would be very difficult to break the contact to pull out the holder; so, I have provided a mechanism which loosens the holder during the time that the plunger is being retracted. This mechanism comprises a cavity 226 in the plunger, a pin 230 which extends outwardly of the cavity and an ejector 231 disposed on the pin. The ejector is urged outwardly by a spring 232 and this outward motion is limited by the abutment 233. By comparing the position of the ejector in FIGURES 10 and 11, it will be seen that the ejector can move within and without the cavity 226 and is supported for motion outside the cavity by the pin. As indicated in FIGURE 11, the ejector, when the plunger is in the locked position, is adapted to fit into a cavity 234 adjacent the cavity 225. The manner in which the ejector functions is explained following.

First, assume that the various parts are in a position as shown in FIGURE 11. When the plunger is moved inwardly, the ejector will be carried along with it until such time as the tip 235 of the ejector engages the edge 236 of the cavity 234. With the continued inward motion of the plunger, the ejector will remain fixed against the tip 236. As the plunger moves in, the relative motion of the ejector with respect to the plunger includes a component which is radial of the plunger (due to the fact that the ejector motion axis is oriented transversely to the plunger motion axis), the point 235 of the plunger will become free of the point 236 and the spring will operate to force the ejector into the cavity 234 or as is shown in FIGURE 10. When the plunger is withdrawn, the ejector will be carried with it. The ejector will move in unison with the plunger so that there will be no radial component. Hence, the ejector will engage the release surface or the wall of the cavity 234 and exert an axial force which will loosen the holder in the socket. The holder is then completely free to be withdrawn by the transfer carriage.

Each of the mounts is adapted to be rotated in unison from the active to the inactive position by a motor 240. The motor 240 comprises a cylinder 241 which is formed in the head and a piston 242 is mounted for reciprocating motion in the cylinder. The reciprocating motion is effected by controlling fluid in the chambers 243 and 244. The piston 242 has a pair of opposed racks 245 and 246 which respectively mate with pinions 250 and 251. The pinion 250 is formed on the mount 194 and the pinion 251 is formed on the mount 195. When the piston is in the up position as shown in FIGURE 4, the mounts are in the active position. When the piston is moved downwardly, the pinions are rotated so that the mounts move 90° or to the active position.

The manner in which the various hydraulic mechanisms described above are operated will be explained in connection with FIGURE 24.

The passage of fluid to and from the various hydraulic mechanisms is controlled by solenoid operated valves. The energizing and de-energizing of the solenoids is controlled by relays which are part of the automatic control system for the lathe.

In FIGURE 24, the hydraulic circuit includes a hydraulic pump 253 operated by a motor 254. The discharge side of the pump feeds a pressure line 255 which is interconnected to the valves V-1 to V-10. The drain line 256 running to sump 257 is also connected to the valves. The valves are operated by the solenoids sol A to sol J. All of the valves are spring biased, so that when the solenoid is de-energized, the spring moves the valve spool to make the indicated interconnection. As shown in FIGURE 24, all of the solenoids are de-energized.

A typical operation for effecting a transfer of tool holder as between turret and magazine will be described below.

Assume that all the parts are in position as indicated in FIGURE 13 with the turret mounts 194 and 195 supporting the tool holders 21 and 22. The tool $t$-1 in the holder 22 is machining the workpiece WP. The holder 21 is to be removed and a new holder substituted.

The next step is to cause the locking means 32 to unlock the holder 21. To do this the solenoid sol F is energized and this causes the valve V-6 to connect the line 258 to pressure line 255 and connect the line 259 to drain line 256. Fluid in the chambers 223 and 224 causes the plunger 220 to move outwardly. This unlocks and loosens the holder in a manner explained heretofore.

The next step is to move the transfer carriage toward the turret to pick up the holder 21. This is done by energizing and de-energizing solenoid sol G which controls the transfer reciprocation motor 130.

The solenoid sol G is then energized to cause the valve V-7 to connect the line 260 to the pressure line 255 and the line 261 to drain line 256. Fluid in the chambers 124 and 125 causes the piston 123 to move to the left and move the transfer arm and carriage toward the turret (FIGURE 14). The dovetails in the transfer carriage mate with the dovetails in the holder. Solenoid sol G is then de-energized to reverse the direction of the fluid to the motor 130. The transfer arm and carriage move away from the turret and the carriage withdraws the holder (FIGURE 15).

The next step is to rotate the arm and carriage upwardly to deposit the holder in the magazine. This is done by the solenoid sol H which controls the transfer rotation motor 13.

When solenoid sol H is energized and the valve V-8 connects the line 262 to pressure line 255 and line 263 to drain line 256. Fluid in chambers 140 and 141 moves piston 135 to the left and this causes the transfer arm and carriage to rotate up to the turret-charge position. When the transfer arm and carriage move to the turret-charge position, the carriage deposits the holder in the magazine carrier (FIGURE 16).

It is necessary then to strip the holder from the transfer carriage and this is done by moving the magazine toward the tail stock. This is done by solenoid sol I which controls magazine reciprocation motor 48. When the solenoid sol I is energized, the valve V-9 connects the line 264 to the pressure line 255 and connects the line 265 to the drain line 256. The fluid in the chambers 46 and 47 causes the piston 42 to move to the right and to move the magazine toward the tail stock. Since the jaws on the carrier are disposed in the peripheral slot in the holder shank, the jaws cause the holder to move rearward with the magazine and be stripped away from the transfer carriage (FIGURE 17).

The magazine is then rotated to bring the next desired tool holder 34 to the charge position. This is done by the solenoid sol J which controls the magazine rotation motor 96.

When the solenoid sol J is energized, the valve V-10 interconnects the line 270 with the pressure line 255. The line 271 is connected to the drain line 256. The motor operates and the Geneva drive moves the turret around until such time that the coding mechanism on the magazine signals the automatic control system to stop turret rotation by de-energizing solenoid sol J.

With the new tool holder 34 in the charge position (FIGURE 18), the magazine is then moved to the left or toward the head stock to deposit the new holder on the carriage. This is done by energizing the solenoid sol I which causes the valve V-9 to reverse the fluid to the magazine reciprocating motor 48 so that the magazine then moves to the left taking the holder 34 along with it (FIGURE 19.) In moving to the left, the dovetails on the new holder 34 mate with the dovetails on the transfer carriage.

The new holder 34 is now stripped out of the magazine and moved down in position to be inserted in the turret. This is done by moving the transfer carriage to the turret-charge position. For this purpose, the solenoid sol H is de-energized to cause the valve V–8 to reverse the direction of fluid to the transfer rotation motor 132 (FIGURE 20).

The holder is now in position to be inserted into the frame and for this operation the transfer reciprocation motor 130 is actuated by energizing the solenoid sol G which reverses the direction of fluid to the motor 130 and the motor causes the transfer arm and carriage to move up to the turret and the carriage deposits the holder 34 in the mount 194. The new holder is then locked in the mount by the operation of the locking mechanism 32 and this is initiated by de-energizing the solenoid sol F. The solenoid sol G is then de-energized to back the transfer arm and carriage away from the turret (FIGURE 23). The new holder 34 and its tool t–3 are now ready to be swung into working position as soon as the tool t–1 is finished machining.

As soon as the tool t–1 completes its operation, the slide 11 is moved to back off the tool t–1 and the tools t–1 and t–3 are switched in position. This is done as follows:

First the mounts are rotated to the inactive position and then the turret rotated to reverse the position of the tools. This is done by energizing solenoids sol A, sol B and sol C.

When solenoid sol A is energized, the line 272 feeding the mount locks and turret head clamps is connected to drain line 256. The shoes 182 and 183 are moved upwardly by the springs 192 and 193 so that the turret head is free to be rotated. Also the pressure in chamber 211 is relieved so that the piston 212 no longer locks the mount 194. A similar locking arrangement (not shown) for mount 195 is relieved. Both mounts 194 and 195 are free to be rotated to the inactive position.

Solenoid sol B controls the mount rotation motor 240. When the solenoid sol B is energized, the valve V–2 connects the line 273 to the pressure line 255 and connects the line 274 to drain line 256. Fluid in the chambers 243 and 244 causes the piston 242 to move down. This rotates the mounts 194 and 195 to the up or inactive position.

Solenoid C controls the turret head motor 164 for rotation in one direction (sol D controls rotation in the opposite direction). When the solenoid sol C is energized, the valve V–3 connects the line 275 to pressure line 255 and connects line 276 to drain line 256. Fluid in the cylinders 169 and 170 causes the pistons 165 and 166 to move. When the pistons have bottomed, the turret is rotated 180°.

The solenoid sol B is then de-energized and the valve V–2 reverses the direction of fluid to the mount motor 240. The line 274 is connected to pressure line 255 and the line 273 is connected to drain line 256. The piston moves up to the position shown to cause the mounts to rotate to the active position.

The solenoid sol A is de-energized to actuate the turret head clamps and the mount locks. When solenoid sol A is de-energized the valve V–6 connects line 272 to pressure line 255. Pressure in the chambers 190 and 191 moves the shoes 182 and 183 into clamping position. Also, the pressure in chamber 211 causes the mount 194 (and 195) to be locked in the active position.

The slide 11 and/or carriage is now operated to bring the tool t–3 into working position. The holder 22 and its tool t–1 are now ready to be removed and replaced.

I claim:

1. In tool changing and supporting apparatus for a machine tool having a bed, turret apparatus for supporting a tool during a working operation comprising:
   a base section connected with the machine bed;
   a head section disposed on said base section;
   means rotatably mounting said head section on said base section for rotation about an axis relative to the base section;
   a tool holder mount on said head section and movable therewith, the mount being formed with a socket;
   a tool holder removably mounted in said socket;
   head drive means to rotate said head section about said axis to locate the tool holder mount in a work position or in a charge position, the work and charge positions being spaced from one another about the head rotational axis, in the work position the mount supporting the tool holder for its tool to perform a working operation and in the charge position the mount supporting the tool holder for removal from the mount and further in the charge position the mount being positioned to accept a tool holder to replace first said tool holder;
   means on said head section rotatably mounting said tool holder mount on the head section for rotation about an axis as between an active and an inactive position, in the active position the mount orienting the tool holder in position for its tool to perform a working operation and for the holder to be removed from the mount and in the inactive position orienting the holder to extend at an angle to its active position; and
   drive means on said head section to rotate said mount as between said active and inactive positions.

2. A construction in accordance with claim 1 further including abutment means on said head section engageable with the tool holder mount to locate the mount in said active and inactive positions.

3. A construction in accordance with claim 1 further including mechanism on said head section operable independently of said mount drive means to engage with the tool holder mount and lock the same in its active position.

4. In tool changing and supporting apparatus for a machine tool having a bed, turret apparatus for supporting a tool during a working operation comprising:
   a base section connected with the machine bed;
   a head section disposed on said base section;
   means rotatably mounting said head section on said base for rotation about an axis relative to the base section;
   a first tool holder mount on said head section and movable therewith, the mount being formed with a socket;
   a tool holder removably mounted in said socket;
   a second tool holder mount on said head section and movable therewith, the mount being formed with a socket;
   a tool holder removably mounted in last said socket;
   head drive means to rotate said head section about said axis to an operative position wherein the tool holder mounts are respectively located in work and charge positions spaced from one another about the head rotational axis, in the work position each mount supporting its tool holder in position for its tool to perform a working operation and in the charge position each mount supporting its tool holder for removal from the mount and further in the charge position each mount being positioned to accept a tool holder to replace first said tool holder;
   means on said head section rotatably mounting first said tool holder mount on the head section for rotation about an axis as between an active position and an inactive position, in the active position the mount orienting the tool holder in position for its tool to perform a working operation and for the holder to be removed from the mount and in the inactive position orienting the holder to extend at an angle to its active position;
   means on said head section rotatably mounting said second tool holder mount for rotation about an axis as between an active position and an inactive position, in the active position the mount orienting the tool holder in position for its tool to perform a working operation and for the holder to be removed from the mount and in the inactive position orienting the holder to extend at an angle to its active position; and drive means for simultaneously rotating said first and second mounts as between said active and inactive positions.

5. A construction in accordance with claim 4 further including abutment means on said head section and engageable with each said tool holder mount to determine the respective active positions.

6. In tool changing and supporting apparatus for a machine tool having a bed, turret apparatus for supporting a tool during a working operation comprising:
   a base section connected with the machine bed;
   a head section disposed on said base section;
   means rotatably mounting said head section on said base section for rotation about an axis relative to the base section;
   means on said head section forming a conical-shaped socket;
   a tool holder having a conical-shaped shank disposed in said socket and the shank being formed with first and second cavities extending generally radially of the socket axis;
   a plunger on said head;
   means mounting said plunger on said head for reciprocating movement along an axis transverse the socket axis to provide for the plunger to enter into and withdraw from first said cavity, the plunger when disposed in with the cavity engaging the shank and causing the same to tightly abut the conical socket to lock the holder in the socket;
   plunger drive means providing said reciprocating motion;
   an ejector;
   means mounting the ejector on the plunger for movement therewith and for movement independently of the plunger along an axis transverse to said plunger motion axis;
   a spring biasing said ejector for movement along its axis and in a direction away from said plunger;
   means on said plunger limiting the motion of the ejector as provided by the spring, movement of the ejector along its axis permitting the ejector to enter said second cavity when the plunger is moved into said first cavity and the ejector being movable with the plunger when the same is withdrawn from said first cavity, the ejector movement causing the ejector to exert a force on the second cavity wall to move the shank away from the socket and thereby loosen the holder in the socket.

7. A construction in accordance with claim 6 wherein said plunger drive means comprises a cylinder formed in said head and a double acting piston mounted for reciprocating motion in said cylinder and means connecting the plunger and the piston.

8. In tool changing and supporting apparatus for a machine tool having a bed transfer means to transfer tools between a magazine and a turret comprising:
   a cylinder and means rotatably mounting the cylinder on the bed of the machine, the cylinder being formed with a pair of axially extending slots;
   means on the bed of the machine for rotating the cylinder about the cylinder axis as between two rotational positions;
   a double acting piston in said cylinder and mounted for reciprocating motion along the cylinder axis;
   a pin connected with said piston and extending outwardly of said slots, the slots permitting reciprocating motion of the pin and the piston;
   a sleeve surrounding said cylinder and connected with said pin, the reciprocating motion of the pin causing reciprocating motion of the sleeve over the cylinder and pin fixing the piston and sleeve for rotational motion in unison with the rotational motion of the cylinder;
   a transfer arm fixed to said sleeve and rotatably and axially movable with the sleeve;
   a transfer carriage adjacent one end of the transfer arm; and
   means connecting said transfer carriage with said transfer arm to partake of the axial and rotational movements of the arm and the connecting means including mechanism providing for limited yielding movement of the carriage relative to the arm the yielding being in a plane normal to the rotational axis of the cylinder.

9. In a tool changing and supporting apparatus for a machine tool having a bed, magazine apparatus for supporting a plurality of tools and for participating in the tool change operation comprising:
   a frame member connected with the machine bed, the frame having means forming a cylinder;
   a double acting piston mounted for reciprocating motion in said cylinder;
   an annular-shaped plate fixed to said piston and movable therewith;
   means connected between said piston and said frame to maintain the piston and plate non-rotatable and permitting said reciprocating motion;
   annular-shaped tool holder carrier support means adjacent said plate;
   means mounting the support means on the piston for reciprocating motion with the piston and for rotation relative to the piston about the reciprocating motion axis;
   a plurality of tool holder carriers spaced about the periphery of said support means and connected to the support for movement therewith, each carrier having means for mounting a tool holder and at least some of the carriers removably mounting a tool holder; and
   drive means connected between said plate and said support means for rotating the support.

10. A construction in accordance with claim 9 wherein each said tool holder has a conical shank formed with a peripheral groove and each carrier comprises a pair of jaws respectively mounted on the support for pivoting motion about axes parallel to the rotational axis of the support and means biasing each jaw of a pair toward one another, the jaws each respectively having annular cavities facing one another and adapted to fit into and at least partially surround the peripheral groove of a tool holder and removably maintain the same in the carrier.

11. A construction in accordance with claim 9 wherein adjacent each carrier there is a plurality of code plungers mounted on the support, each code plunger being adapted to be engaged and moved by code cam means on a tool holder held in the carrier and further wherein there is adjacent each plunger a switch mounted on said plate and adapted to be actuated by the movement of its plunger.

12. In tool changing and supporting apparatus for a machine tool having a bed, magazine apparatus for supporting a plurality of tools and for participating in the tool change operation comprising:
   a frame member connected with the machine bed;
   tool holder carrier support means;
   mechanism connecting said support means with said frame for rotation about an axis;
   a plurality of tool holder carriers disposed around the periphery of said support means and connected with the support means for movement therewith, each carrier comprising a pair of gripping jaws for receiving a holder therebetween and means yieldably urging the jaws toward one another for gripping and supporting a tool holder when the holder is disposed between the jaws, the jaws receiving and discharging a tool holder when the holder is moved radially of the support rotational axis to and from the jaws and the jaws having means operative when a holder is disposed therebetween to prevent movement of the holder in a direction along said axis.

13. A construction in accordance with claim 12 wherein each pair of gripping jaws are respectively mounted on the support means for pivoting motion about axes parallel to the rotational axis of the support means and there are spring means biasing the jaws toward one another.

14. A construction in accordance with claim 12 where the jaws of each pair respectively have annular cavities facing one another and adapted to at least partially surround a tool holder.

15. In tool changing and supporting apparatus for a machine tool having a bed, magazine apparatus for supporting a plurality of tools and for participating in the tool change operation comprising:
  a frame member connected with the machine bed;
  tool holder carrier support means;
  mechanism connecting the carrier support means with said frame for rotation about an axis and for reciprocating motion along the axis;
  a plurality of tool holder carriers disposed around the periphery of said support means and connected with the support means for movement therewith;
  a plurality of tool holders disposed in at least some of said carriers, each holder having a shank formed with a peripheral groove, and each said carrier comprising a pair of gripping jaws and means yieldably urging the jaws toward one another, the jaws fitting into the peripheral groove of the tool holder to removably maintain the tool holder in position.

16. In tool changing and supporting apparatus for a machine tool having a bed multiple tool lathe, the combination of:
  a frame connected to said bed;
  tool holder carrier support means;
  mechanism connecting the support means with said frame for rotation about an axis and for reciprocation along the axis;
  a plurality of tool holder carriers disposed about the periphery of said support for movement therewith;
  a plurality of tool holders respectively removably mounted in at least some of said carriers;
  means for each carrier for holding its tool holder against movement in a direction along said axis and means to receive and support a tool holder and to permit insertion and withdrawal of a tool holder when the tool holder is moved radially of said axis;
  a transfer arm;
  means mounting said transfer arm on the machine bed for reciprocating motion along a second axis and for rotation about said second axis;
  a transfer carriage mounted adjacent one end of said arm and movable therewith;
  support drive means including mechanism for rotating said support means to bring any of said carriers to a predetermined rotational position, the predetermined position being a charge position wherein the tool holder carrier is oriented for receiving a tool holder and for having a tool holder removed therefrom; and
  transfer arm drive means for rotating said transfer arm to a magazine-charge position wherein the transfer carriage is positioned for the withdrawal or insertion of a tool holder from or in a carrier and the support drive means further including mechanism for moving the magazine along said rotational axis while the magazine is in the magazine-charge position and while the transfer arm is in the magazine-charge position to remove a tool holder from the transfer carriage or to insert a tool holder in the carriage.

17. Tool changing and supporting apparatus for a machine tool having a bed comprising:
  an annular-shaped magazine head;
  means mounting the magazine head on the machine bed for reciprocating motion along an axis and for rotation about the axis;
  a plurality of tool holder carriers disposed around the periphery of the magazine for movement therewith;
  a plurality of tool holders respectively removably mounted in at least some of said carriers;
  means for each carrier for holding its tool holder against movement in a direction along said rotational axis and means to receive and mount a tool holder and to permit insertion and withdrawal of a tool holder when the tool holder is moved radially of said rotational axis;
  magazine drive means including mechanism for rotating said magazine head to bring any one of said carriers to a predetermined rotational position, the predetermined position being a magazine-charge position wherein the carrier is oriented for receiving a tool holder and for having a tool holder removed therefrom;
  a rotary turret having a pair of tool holder mounts, each mount supporting a tool holder and its tool;
  means rotatably supporting the turret on said bed;
  turret drive means to rotate the turret to an operative position wherein one tool holder mount supports its tool holder in position for the tool to perform a working operation while the other tool holder mount is in a position wherein its tool holder can be removed and another tool holder inserted during the period of said working operation;
  a transfer arm;
  means mounting said transfer arm on said bed for reciprocating motion along a second axis and for rotational motion about said second axis;
  a transfer carriage mounted adjacent one end of said arm and movable therewith;
  means on said transfer carriage for receiving and removably supporting a tool holder; and
  arm drive means for rotating said transfer arm about said second axis to a turret-charge position wherein the transfer carriage is positioned to withdraw or insert a tool holder from or in a tool holder mount and for moving the arm along said second axis toward and away from said turret when the arm is in the turret-charge position to effect said withdrawal or insertion, the arm drive means also including mechanism for rotating the transfer arm about said second axis to a magazine-charge position wherein the transfer carriage is positioned for the withdrawal or insertion of a tool holder from or in a carrier and the magazine drive means further including mechanism for moving the magazine along said rotational axis while the magazine is in the magazine-charge position and while the transfer arm is in the magazine-charge position to remove a tool holder from transfer carriage or an insert of a tool holder in the carriage.

18. A construction in accordance with claim 17 further including:
  control means connected with said magazine, turret and arm drive means to effect the following operations;
  to cause said magazine to rotate to said magazine-charge position;
  to sause said turret to rotate to said operative position;
  to cause said arm to rotate to said turret-charge position and to move axially until the transfer carriage is engaged with a holder mounted in said other mount and then to move axially to remove the holder from the other mount and then cause the arm to rotate to said magazine-charge position so that the transfer carriage deposits the removed holder in a carrier on the magazine;
  to cause said magazine to move axially and pull said removed holder from the transfer carrier and then to rotate until a new holder is in the magazine-charge position and then to move axially to engage the new holder with the transfer carriage; and to cause said arm to rotate and withdraw the new holder from the carrier and continue rotation until the arm is in the turret-charge position and then to cause the arm to move axially until the transfer carriage inserts the new holder in said other mount.

19. Tool changing and supporting apparatus for a machine tool having a bed comprising:

an annular-shaped magazine head;

means mounting the magazine head on the machine bed for reciprocating motion along an axis and for rotation about the axis;

a plurality of tool holder carriers disposed around the periphery of the magazine head and movable therewith;

means on each carrier to receive and hold a tool holder and to permit withdrawal of the tool holder;

a plurality of tool holders respectively disposed in at least some of said carriers;

a turret rotatably mounted on said bed and having a pair of tool holder mounts, each mount supporting a tool holder and its tool;

turret drive means to rotate the turret to an operative position wherein one tool holder mount supports its tool holder and tool in position for the tool to perform a working operation while the other tool holder mount is in a position wherein its tool holder can be removed and another tool holder inserted during the period of said working operation; and means mounted on the machine bed for movement between said turret said magazine and operative while the tool in said one mount is performing a working operation to remove a tool holder from said other mount and insert the tool holder in said magazine and then receive a new tool holder from said magazine and insert the new tool holder in said other mount.

20. Tool changing and supporting apparatus for a machine tool having a bed comprising:

a turret rotatably mounted on the machine bed having a pair of tool holder mounts, each mount supporting a tool holder and its tool, the turret being rotatable to an operative position wherein one tool holder mount supports its tool holder in position for the tool to perform a working operation while the other tool holder mount is in a position wherein its tool holder can be removed and another tool holder inserted during the period of said working operation;

turret drive means for rotating said turret to said positions;

a magazine rotatably mounted on the machine bed and having a plurality of tool holder carriers, at least some of the carriers respectively removably mounting a tool holder; and transfer mechanism mounted on the machine bed and movable as between said magazine and said turret to effect the transfer of a tool holder from the turret to the magazine and to receive and transfer another tool holder from the magazine to the turret during the period of said working operation.

21. Tool changing and supporting apparatus for a machine tool having a bed comprising:

a turret rotatably mounted on the machine bed having a pair of tool holder mounts, each mount supporting a tool holder and its tool, the turret being rotatable to an operative position wherein one tool holder mount supports its tool holder is position for the tool to perform a working operation while the other tool holder mount is in a position wherein its tool holder can be removed and another tool holder inserted during the period of said working operation;

turret drive means for rotating said turret;

a magazine rotatably mounted on the machine bed and having a plurality of tool holder carriers, at least some of the carriers respectively removably mounting a tool holder;

magazine drive means for intermittently rotating the magazine to bring any one of said carriers to a predetermined rotational position wherein the carrier is oriented for receiving a tool holder and for having a tool holder removed therefrom;

transfer mechanism on the machine bed and movable as between said magazine and said turret to effect the transfer of a tool holder from the turret to the magazine and to receive and transfer another tool holder from the magazine to the turret during the period of said working operation; and code mechanism comprising plunger means on the magazine respectively disposed adjacent each of the tool holder carriers and cam means respectively on each tool holder engaging the plunger means when a holder is disposed in a carrier and switch means fixed on the cross slide and actuated by the plunger means when a carrier and holder are in said rotational position, the switch means when so actuated being for use in stopping the operation of the magazine drive means.

22. Tool changing and supporting apparatus for a machine tool having a bed comprising:

a turret rotatably mounted on the machine bed having a pair of tool holder mounts, each mount supporting a tool holder and its tool, the turret being rotatable to an operative position wherein one tool holder mount supports its tool holder in position for the tool to perform a working operation while the other tool holder mount is in a position wherein its tool holder can be removed and another tool holder inserted during the period of said working operation;

turret drive means for rotating the turret to said positions;

a magazine rotatably mounted on the machine bed and having a plurality of tool holder carriers, at least some of the carriers respectively removably mounting a tool holder;

magazine drive means including mechanism for rotating the magazine to bring any one of said carriers to a magazine-charge position wherein the carrier is oriented for receiving a tool holder and for having a tool holder removed therefrom;

transfer means mounted on the machine bed to effect the transfer of a tool holder as between the turret and magazine, the transfer means including an arm supporting a transfer carriage having means for removably mounting a tool holder, the arm and carriage being movable as between the magazine and turret to effect the transfer of a tool holder from the turret to the magazine and then to receive another tool holder from the magazine and transfer the same to the turret; and means mounting the transfer carriage on the arm and providing for the carriage to have limited universal movement in a plane normal to the direction of motion of the carriage when the carriage moves a tool holder for inserting the holder in or withdrawing the holder from the turret.

23. Tool changing and supporting apparatus for a machine tool having a bed comprising:

a turret rotatably mounted on the machine bed having a pair of tool holder mounts, each mount supporting a tool holder and its tool, the turret being rotatable to an operative position wherein one tool holder mount supports its tool holder in position for the tool to perform a working operation while the other tool holder mount is in a position wherein its tool holder can be removed and another tool holder inserted during the period of said working operation;

turret drive means for rotating the turret;

a magazine rotatably mounted on the machine bed and having a plurality of tool holder carriers, at least some of the carriers respectively removably mounting a tool holder;

magazine drive means for rotating the magazine to bring any one of said carriers to a predetermined rotational position wherein the carrier is oriented for receiving a tool holder and for having a tool holder removed therefrom; and mechanism for transferring tool holders as between the turret and the magazine, including a transfer carriage for removably mounting a tool holder and means mounting the transfer carriage to effect withdrawal or insertion of a tool holder from or in a tool holder mount and for the transfer carriage to deposit a withdrawn tool holder in the magazine, together with means to cause the magazine to move relative to the transfer carriage for causing a tool holder mounted on the transfer carriage to be removed or a new tool holder to be deposited thereon.

24. Tool changing and supporting apparatus in a machine tool having a bed comprising:

a turret rotatably mounted on the machine bed and having a pair of tool holder mounts, each mount supporting a tool holder and its tool, the turret being rotatable to an operative position wherein one tool holder mount usports its tool holder in position for the tool to perform a working operation while the other tool holder mount is in a position wherein its tool holder can be removed and another tool holder inserted during the period of said working operation;

turret drive means for rotating the turret to said position;

locking mechanism adjacent each tool holder mount for locking and unlocking a holder supported in the mount;

lock drive means for operating said locking mechanism;

a magazine mounted on the machine bed for rotation and for reciprocation along an axis and the magazine having a plurality of tool holder carriers, at least some of the carriers respectively removably mounting a tool holder;

means for each carrier preventing movement of its holder along said axis but permitting movement radially of said axis, the radial motion being for inserting or withdrawing a holder;

magazine drive means including mechanism for rotating the magazine to bring any one of said carriers to a magazine-charge position wherein the carrier is oriented for receiving a tool holder and for having a tool holder removed therefrom, the magazine drive means further including mechanism for reciprocating the magazine along its rotational axis while in the magazine-charge position;

transfer means mounted on the machine bed for movement along a first path toward and away from the turret and for movement along a second path between the turret and magazine, the transfer means having a carriage for removably mounting a tool holder;

transfer drive means for moving the transfer means along said paths;

control means connected with said turret drive means, said lock drive means, said magazine drive means and said transfer drive means to effect the following operations:

to cause said turret to rotate to said operative position and to cause said locking mechanism to unlock the holder in said other mount;

to cause said magazine to rotate to said magazine-charge position;

to cause said transfer means to move along said first path toward the turret so that its carriage engages the tool holder in said other mount and to move away from the turret to strip the holder out of the mount and then to cause the transfer means to move along said second path toward said magazine to deposit the holder in a carrier in the magazine;

to cause the magazine to move axially and pull said removed holder from the transfer carriage and then to rotate until a new holder is in the magazine-charge position and then to move axially to engage the new holder with the transfer carriage;

to cause said transfer means to move along the second path away from the magazine to withdraw the new holder from the magazine and then move along the first path toward the turret to insert the new holder in said other mount; and to cause said locking mechanism to secure the new holder in said other mount.

25. Tool changing and supporting apparatus in a machine tool having a bed comprising:

an annular-shaped magazine head;

means mounting the magazine head on the machine bed for reciprocating motion along an axis and for rotation about the axis;

a plurality of tool holder carriers disposed around the periphery of the magazine head and movable therewith;

means on each carrier to receive and hold a tool holder and to permit withdrawal of the tool holder;

a plurality of tool holders respectively disposed in at least some of said carriers;

a turret rotatably mounted on said bed and having a pair of tool holder mounts, each mount supporting a tool holder and its tool;

turret drive means to rotate the turret to an operative position wherein one tool holder mount supports its tool holder and tool in position for the tool to perform a working operation while the other tool holder mount is in a position wherein its tool holder can be removed and another tool holder inserted during the period of said working operation; and transfer means mounted on the machine bed for movement between said turret and said magazine and operative while the tool in said one mount is performing a working operation to remove a tool holder from said other mount and insert the tool holder in a carrier in said magazine and the magazine, when the holder is so inserted, moving axially to strip the holder off of the transfer means.

26. Tool changing and supporting apparatus in a machine tool having a bed comprising:

an annular-shaped magazine head;

means mounting the magazine head on the machine bed for reciprocating motion along an axis and for rotation about the axis;

a plurality of tool holder carriers disposed around the periphery of the magazine head and movable therewith;

means for each carrier preventing movement of its holder in a direction along said axis but permitting movement radially of the axis, the radial motion being for inserting and withdrawing a holder;

a plurality of tool holders respectively disposed in at least some of said carriers;

a turret rotatably mounted on said bed and having a pair of tool holder mounts, each mount supporting a tool holder and its tool;

turret drive means to rotate the turret to an operative position wherein one tool holder mount supports its tool holder and tool in position for the tool to perform a working operation while the other tool holder mount is in a position wherein its tool holder can be removed and another tool holder inserted during the period of said working operation;

locking mechanism adjacent each tool holder mount for locking and unlocking a holder supported in the mount; and transfer means mounted on the machine bed for movement between said turret and said magazine and operative while the tool in said one mount is performing a working operation and while the locking mechanism has unlocked the holder supported in said other mount to engage and remove a tool holder from said other mount and move towards said magazine to insert the removed holder in a carrier in said magazine and the magazine, when the tool holder is so inserted, moving axially to strip the holder off the transfer means.

References Cited by the Examiner

UNITED STATES PATENTS 3,052,011  9/62  Brainard.

RICHARD H. EANES, JR., *Primary Examiner.*

UNITED STATES PATENT OFFICE
CERTIFICATE OF CORRECTION

Patent No. 3,186,085 June 1, 1965

William C. E. Coate

It is hereby certified that error appears in the above numbered patent requiring correction and that the said Letters Patent should read as corrected below.

Column 2, line 59, for "positioon" read -- position --; column 9, line 66, for "sump" read -- pump --; column 14, line 50, for "is" read -- are --; column 16, line 64, for "sause" read -- cause --; column 17, line 32, after "turret" insert -- and --; lines 49 and 50, for "positions" read -- position --; line 68, for "is" read -- in --; column 19, line 27, for "uspports" read -- supports --.

Signed and sealed this 7th day of December 1965.

(SEAL)
Attest:

ERNEST W. SWIDER
Attesting Officer

EDWARD J. BRENNER
Commissioner of Patents